United States Patent
Lemsitzer et al.

(10) Patent No.: US 11,736,937 B2
(45) Date of Patent: Aug. 22, 2023

(54) UWB COMMUNICATION NODE AND OPERATING METHOD

(71) Applicant: NXP B.V., Eindhoven (NL)

(72) Inventors: Stefan Lemsitzer, Stainz (AT); Srivathsa Masthi Parthasarathi, Bangalore (IN); Hugues Jean Marie de Perthuis, Garcelles (FR)

(73) Assignee: NXP B.V., Eindhoven (NL)

( * ) Notice: Subject to any disclaimer, the term of this patent is extended or adjusted under 35 U.S.C. 154(b) by 142 days.

(21) Appl. No.: 17/302,005

(22) Filed: Apr. 21, 2021

(65) Prior Publication Data

US 2021/0360395 A1 Nov. 18, 2021

(30) Foreign Application Priority Data

May 15, 2020 (EP) .................................... 20305509

(51) Int. Cl.
*H04L 29/06* (2006.01)
*H04W 12/037* (2021.01)
(Continued)

(52) U.S. Cl.
CPC ........... *H04W 12/037* (2021.01); *H04L 9/085* (2013.01); *H04L 9/30* (2013.01); *H04L 9/3273* (2013.01); *H04W 4/06* (2013.01); *H04W 4/80* (2018.02)

(58) Field of Classification Search
CPC ....... H04W 12/037; H04W 4/80; H04W 4/06; H04L 9/085; H04L 9/30; H04L 9/3273
See application file for complete search history.

(56) References Cited

U.S. PATENT DOCUMENTS

| 5,748,736 A | 5/1998 | Mittra |
| 6,041,408 A | 3/2000 | Nishioka et al. |

(Continued)

FOREIGN PATENT DOCUMENTS

EP  2874421 A1  5/2015

OTHER PUBLICATIONS

Madiseh, Masoud Ghoreishi, et al. "Secret key extraction in ultra wideband channels for unsynchronized radios." 6th Annual Communication Networks and Services Research Conference (cnsr 2008). IEEE, 2008. (Year: 2008).*

(Continued)

*Primary Examiner* — Shawnchoy Rahman (57) ABSTRACT

In accordance with a first aspect of the present disclosure, an ultra-wideband communication node is provided, comprising: an ultra-wideband communication unit configured to transmit one or more messages to a plurality of external responder nodes and to receive one or more responses from said responder nodes; a processing unit configured to use a common cryptographic session key to encrypt said messages, wherein said common cryptographic session key is a key shared between the ultra-wideband communication node and all the external responder nodes; wherein the processing unit is further configured to use responder-specific cryptographic session keys to decrypt the responses and/or to encrypt further messages to the responder nodes, and wherein each individual one of said responder-specific cryptographic session keys is a key shared between the ultra-wideband communication node and one of the external responder nodes.

19 Claims, 4 Drawing Sheets

(51) Int. Cl.
*H04W 4/80* (2018.01)
*H04L 9/08* (2006.01)
*H04L 9/30* (2006.01)
*H04L 9/32* (2006.01)
*H04W 4/06* (2009.01)

(56) References Cited

U.S. PATENT DOCUMENTS

| | | | |
|---|---|---|---|
| 6,049,878 | A | 4/2000 | Caronni et al. |
| 6,583,810 | B1 | 6/2003 | Yamamura |
| 6,941,457 | B1 | 9/2005 | Gundavelli et al. |
| 6,987,855 | B1 | 1/2006 | Srivastava |
| 8,254,992 | B1 * | 8/2012 | Ashenbrenner ....... G06F 1/1632 455/41.3 |
| 9,429,992 | B1 * | 8/2016 | Ashenbrenner ..... G06F 13/4081 |
| 10,601,805 | B2 * | 3/2020 | Lerner .................... G06F 21/36 |
| 2005/0047379 | A1 * | 3/2005 | Boyden .............. H04W 12/033 370/338 |
| 2010/0146277 | A1 * | 6/2010 | Mochizuki .............. H04L 9/083 380/279 |
| 2016/0234176 | A1 | 8/2016 | Chu et al. |
| 2020/0062217 | A1 | 2/2020 | Ledvina et al. |
| 2020/0106877 | A1 | 4/2020 | Ledvina et al. |

OTHER PUBLICATIONS

Canetti, Ran et al.; "Multicast Security: A Taxonomy and Some Efficient Constructions"; Published in: IEEE INFOCOM '99. Conference on Computer Communications. Proceedings. Eighteenth Annual Joint Conference of the IEEE Computer and Communications Societies, Mar. 21-25, 1999, New York, NY. The Future is Now (Cat. No. 99CH36320); DOI: 10.1109/INFCOM.1999.751457.

Jeon, YongSung et al.; "Implementation of a LoRaWAN Protocol Processing Module on an Embedded Device Using Secure Element"; 2019 34th International Technical Conference on Circuits/Systems, Computers and Communications (ITC-CSCC); Jun. 23-26, 2019, Jeju Shinhwa World, Republic of Korea; DOI:10.1109/ITC-CSCC.2019.8793333.

Panjwani, Saurabh et al. BLOG; "Multicast Encryption: How to Maintain Secrecy in Large, Dynamic Groups" Computer Science—University of California, San Diego Paper; Downloaded Apr. 19, 2021: http://cseweb.ucsd.edu/~spanjwan/multicast.html.

Panjwani, Saurabh et al.; "Optimal Communication Complexity of Generic Multicast Key Distribution"; Downloaded from the Internet Apr. 21, 2021: https://slidetodoc.com/optimal-communication-complexity-of-generic-multicast-key-distribution/.

"FIRa Consortium Secure UWB Service API"; Initial Version Aug. 30, 2019.

"FIRa Consortium UWB MAC Technical Requirements"; Feb. 2021.

\* cited by examiner

UWB COMMUNICATION NODE AND OPERATING METHOD

CROSS-REFERENCE TO RELATED APPLICATIONS

This application claims priority under 35 U.S.C. § 119 to European Patent Application No. 20305509.0, filed on May 15, 2020, the contents of which are incorporated by reference herein.

TECHNICAL FIELD

The present disclosure relates to an ultra-wideband communication node. Furthermore, the present disclosure relates to a corresponding method of operating an ultra-wideband communication node, and to a corresponding computer program.

BACKGROUND

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

SUMMARY

In accordance with a first aspect of the present disclosure, an ultra-wideband communication node is provided, comprising: an ultra-wideband communication unit configured to transmit one or more messages to a plurality of external responder nodes and to receive one or more responses from said responder nodes; a processing unit configured to use a common cryptographic session key to encrypt said messages, wherein said common cryptographic session key is a key shared between the ultra-wideband communication node and all the external responder nodes; wherein the processing unit is further configured to use responder-specific cryptographic session keys to decrypt the responses and/or to encrypt further messages to the responder nodes, and wherein each individual one of said responder-specific cryptographic session keys is a key shared between the ultra-wideband communication node and one of the external responder nodes.

In one or more embodiments, the communication node comprises a further communication unit which is configured to transmit the common cryptographic session key and the responder-specific cryptographic session keys to the respective external responder nodes.

In one or more embodiments, the further communication unit is a Bluetooth communication unit, a Wi-Fi communication unit or a cellular communication unit.

In one or more embodiments, the communication node further comprises a secure element, wherein the common cryptographic session key and the responder-specific cryptographic session keys are stored in said secure element.

In one or more embodiments, the ultra-wideband communication unit is further configured to receive identifiers from the external responder nodes, wherein said identifiers uniquely identify the external responder nodes, and wherein the processing unit is further configured to use the identifiers to retrieve responder-specific cryptographic session keys from the secure element.

In one or more embodiments, the messages are multicast messages or broadcast messages.

In one or more embodiments, the communication node further comprises an authentication unit configured to perform a mutual authentication process with the external responder nodes.

In one or more embodiments, the messages and the responses include scrambled timestamp sequences and payloads.

In one or more embodiments, the common cryptographic session key and the responder-specific cryptographic session keys are usable for a single communication session or for a limited number of communication sessions.

In one or more embodiments, the processing unit is further configured to: generate a new common cryptographic session key and new responder-specific cryptographic session keys after one or more communication sessions have ended; share said new common cryptographic session key and new responder-specific cryptographic session keys with the responder nodes, wherein the new common cryptographic session key is shared with all the responder nodes and each new responder-specific cryptographic session key is shared with a specific one of said responder nodes.

In one or more embodiments, a communication system comprises a communication node of the kind set forth and the plurality of responder nodes, wherein each one of said responder nodes is configured to: use the common cryptographic session key to decrypt messages received from the communication node; use the responder-specific cryptographic session key that has been shared with the respective responder node to encrypt responses to said messages and/or to decrypt further messages received from the communication node.

In one or more embodiments, the communication node is configured to carry out ranging operations with the responder nodes, wherein said ranging operations include one or more of said messages and one or more of said responses.

In accordance with a second aspect of the present disclosure, a method of operating an ultra-wideband communication node is conceived, comprising: transmitting, by an ultra-wideband communication unit comprised in the communication node, one or more messages to a plurality of external responder nodes and receiving, by said communication unit, one or more responses from said responder nodes; using, by a processing unit comprised in the communication node, a common cryptographic session key to encrypt said messages, wherein said common cryptographic session key is a key shared between the ultra-wideband communication node and all the external responder nodes; using, by said processing unit, responder-specific cryptographic session keys to decrypt the responses and/or to encrypt further messages to the responder nodes, wherein each individual one of said responder-specific cryptographic session keys is a key shared between the ultra-wideband communication node and one of the external responder nodes.

In one or more embodiments, the method further comprises comprising transmitting, by a further communication unit comprised in the communication node, the common cryptographic session key and the responder-specific cryptographic session keys to the respective external responder nodes.

In accordance with a third aspect of the present disclosure, a computer program is provided, comprising executable instructions which, when executed by a processing unit, cause said processing unit to perform the steps of a method of the kind set forth.

DESCRIPTION OF DRAWINGS

Embodiments will be described in more detail with reference to the appended drawings, in which.

DESCRIPTION OF EMBODIMENTS

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

UWB technology may also be used for supporting applications which are typically performed by technologies such as near field communication (NFC), for example for supporting the execution of transactions with another communication device (e.g., a payment terminal). Examples of such transactions include payment transactions in a variety of stores and ticket validations or fare payments in the public transportation sector. Such a transaction usually comprises an exchange of one or more commands (e.g., instructions) and responses (e.g., data) between two communication devices. In such a scenario, a UWB communication device facilitates the localization of the communication counterparts if a communication technology such as Bluetooth low energy (BLE) or Wi-Fi is used for executing a transaction between the communication counterparts. These communication technologies have a larger range than NFC, and therefore the localization of the communication counterparts becomes important. In particular, when NFC is used for carrying out a transaction, the intent of a user is implicitly given because NFC can only be realized while the communication counterparts are in close proximity of each other. However, the intent of a user may not be clear if a larger-range communication technology is used. For example, a user may be within communication range of a payment terminal, such that a transaction might be initiated between his mobile phone and the terminal, but instead of approaching the terminal, the user leaves the store. In this case, the transaction might be executed while this was not intended. Thus, the system may not be sufficiently reliable and secure. In such a case, UWB may be used to track the movement of the user, and if this movement implies the intention of the user to carry out the transaction (e.g., if the phone approaches the terminal in the expected manner) then the transaction may be concluded. Thus, an UWB ranging session involving a plurality of ranging operations to track the phone's movements is used as a complementary security feature, to compensate for the loss of security inherently caused by the larger-range technologies.

Thus, a UWB communication device integrated in a mobile phone may perform a sequence of ranging operations with another UWB communication device integrated in a payment terminal or a transit gate, to increase the reliability and security of a transaction (e.g., to verify whether the phone is carried by a user that approaches the terminal or the gate). The transaction, which is executed through an out-of-band communication channel (i.e., not through the UWB communication channel), may involve initial steps such as the identification, authentication and verification of access rights of the phone, and concluding steps such as the completion of the transaction and the confirmation by the terminal that the transaction has been concluded. The UWB ranging session is used to verify whether the phone approaches the terminal, which implies that the user has the intention to carry out the transaction. In typical NFC use cases, this intent is implicitly given by the technology, because the user needs to be in close proximity (10 cm) of the terminal. Using BLE, the transaction is typically initiated while the user is many meters away from the terminal. Therefore, a UWB ranging session is executed to verify whether the user correctly approaches the terminal, and the transaction is concluded in dependence on the result of the UWB ranging session. The transaction is then carried out using the out-of-band communication channel (BLE). Alternatively, both the ranging operation and the transaction itself may be carried out in-band, i.e. through the UWB communication channel. Thus, the UWB devices may carry out functions which are typically carried out by NFC devices.

A typical UWB ranging session includes one or more messages (i.e., commands) transmitted from a UWB communication node (which is also referred to as a "reader" herein) to one or more external UWB responder nodes (i.e., communication nodes which are external to the communication node), as well as one or more responses to those commands, which are transmitted back to the communication node by the responder nodes. These messages and the responses to these messages should be protected by encryption. For this purpose, cryptographic session keys are used. That is to say, the communication node encrypts the messages using such a session key, and the responder nodes decrypts the messages using the same or a corresponding session key (depending on whether symmetric or asymmetric cryptography is applied). Similarly, the responder nodes encrypt the responses using the session key, and the communication node decrypts the responses using the same or a corresponding session key. Typically, a single shared cryptographic session key is used, i.e. a key which is shared between the communication node and all the responder nodes. This, however, creates a security risk, because each of the responder nodes that has access to the commonly shared key can impersonate any other responder node that makes use of the commonly shared key.

Now discussed are an ultra-wideband communication node and a corresponding method of operating an ultra-wideband communication node, which facilitate increasing the level of security in an ultra-wideband based communication system, in particular by reducing the probability that responder nodes will impersonate each other.

Figure 1:
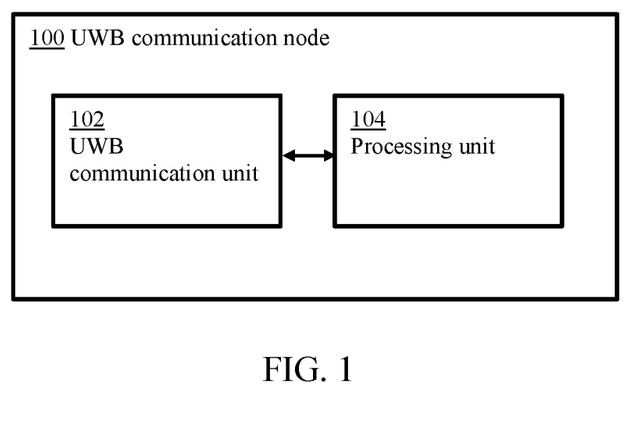
FIG. 1 shows an illustrative embodiment of a UWB communication node.

FIG. 1 shows an illustrative embodiment of a UWB communication node 100. The UWB communication node 100 comprises a UWB communication unit 102 and a processing unit 104. The UWB communication unit 102 is configured to transmit one or more messages to a plurality of external responder nodes and to receive one or more responses from the responder nodes. The processing unit 104 is configured to use a common cryptographic session key to encrypt said messages, wherein said common cryptographic session key is a key shared between the ultra-wideband communication node and all the external responder nodes. Furthermore, the processing unit is configured to use responder-specific cryptographic session keys to decrypt the responses and/or to encrypt further messages to the responder nodes, wherein each individual one of said responder-specific session keys is a key shared between the ultra-wideband communication node and one of the external responder nodes. Thus, each responder node may encrypt its responses using a responder-specific session key, and the processing unit of the communication node may decrypt the responses using the responder-specific session key. Accordingly, since each response node uses a specific session key to encrypt its responses, the risk that other responder nodes can impersonate said responder node is reduced. Nevertheless, the use of a common cryptographic session key for transmitting messages to the responder nodes facilitates achieving an acceptable performance in terms of computing cost. Alternatively or in addition, the responder-specific session key may be used to protect specific messages (i.e., further messages) from the ultra-wideband communication node to the respective responder node. In this way, the risk that other responder nodes can impersonate said responder node is also reduced, while the use of a common cryptographic session key for transmitting the first message or messages to the responder nodes still facilitates achieving an acceptable performance in terms of computing cost. Thus, a responder node may use the responder-specific session key to encrypt its responses and/or to decrypt further messages from the communication node. If the responder node does not use the responder-specific session key to encrypt its responses, it may use the common cryptographic session key for this purpose.

Figure 2:
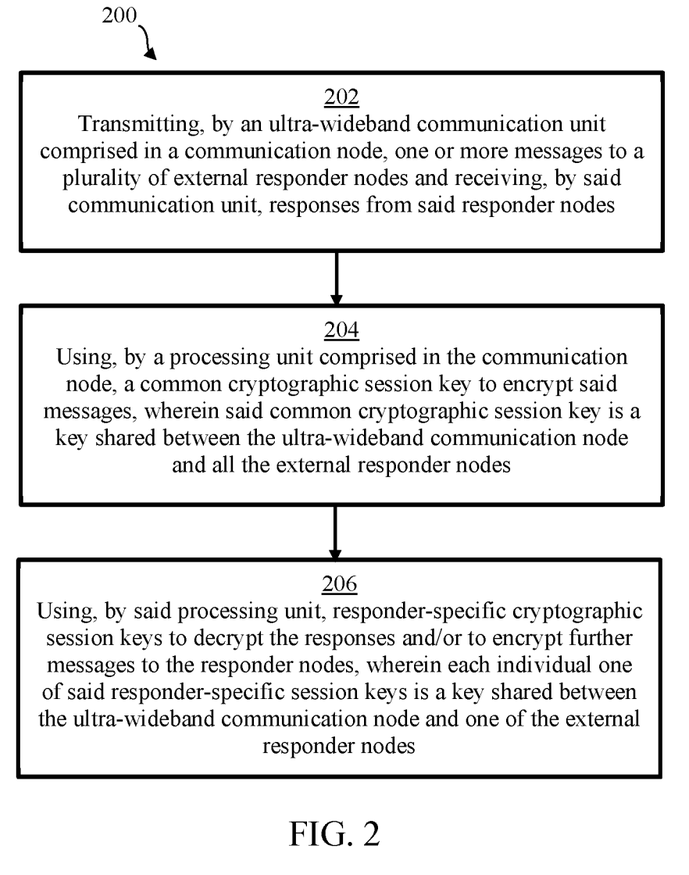
FIG. 2 shows an illustrative embodiment of a method of operating a UWB communication node.

FIG. 2 shows an illustrative embodiment of a method 200 of operating a UWB communication node. The method 200 comprises the following steps. In step 202, an ultra-wideband communication unit comprised in a communication node transmits one or more messages to a plurality of external responder nodes and receives one or more responses from said responder nodes. In step 204, a processing unit comprised in the communication node uses a common cryptographic session key to encrypt said messages, wherein said common cryptographic session key is a key shared between the ultra-wideband communication node and all the external responder nodes. Furthermore, in step 206, said processing unit uses responder-specific cryptographic session keys to decrypt the responses and/or to encrypt further messages to the responder nodes, wherein each individual one of said responder-specific session keys is a key shared between the ultra-wideband communication node and one of the external responder nodes. As explained above, in this way, the risk that responder nodes can impersonate each other is reduced, while an acceptable performance in terms of computing cost may still be achieved. It is noted that the method 200 may at least partially be implemented as a computer program.

In one or more embodiments, the communication node includes a further communication unit which is configured to transmit the common cryptographic session key and the responder-specific session keys to the respective external responder nodes. In this way, the cryptographic session keys are shared with the external responder nodes through an out-of-band communication channel, which reduces the burden on the ultra-wideband communication network. In a practical implementation, the further communication unit is a Bluetooth communication unit, a Wi-Fi communication unit or a cellular communication unit. For instance, to reduce the power consumption of the communication node and the responder nodes, the further communication unit may be a Bluetooth low energy (BLE) communication unit. Furthermore, in one or more embodiments, the communication node additionally includes a secure element, and the common cryptographic session key and the responder-specific cryptographic session keys are stored in said secure element. It is noted that a secure element (SE) may be a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions. By storing the common cryptographic session key and the responder-specific cryptographic session keys in the secure element, the level of security may be further increased. It is noted that the processing unit may also be embedded in the secure element, to further increase the level of security.

In one or more embodiments, the ultra-wideband communication unit is further configured to receive identifiers from the external responder nodes, wherein said identifiers uniquely identify the external responder nodes, and wherein the processing unit is further configured to use the identifiers to retrieve responder-specific session keys from the secure element. In this way, the correct responder-specific cryptographic session key can easily be retrieved from the secure element. Furthermore, the coherence between the content of a response and the cryptographic session key that has been used to encrypt said response can easily be verified. For example, when a responder responds with its identifier and uses a cryptographic session key which has been assigned to another responder, a mismatch between the identifier and the used key will easily be detected. Furthermore, in one or more embodiments, the messages are multicast messages or broadcast messages. In this way, the communication node can easily transmit a single message to multiple responder nodes. Furthermore, in accordance with the present disclosure, the security level of a multicast or broadcast message-response UWB-based communication system is increased by using a common cryptographic session key for encrypting the multicast message or broadcast message, and by using diversified cryptographic session keys for the plurality of responses. It is noted that the term "multicast" refers to a situation in which a message is sent to a predefined subset of intended responders within a larger set of potential responders, while the term "broadcast" refers to a situation in which a message is sent to all potential responders. In both situations, the level of security may be increased by diversifying the cryptographic session keys used by the responders. Since the multicasting or broadcasting communication node shares the diversified cryptographic session keys beforehand only with the specific responder nodes for which they are intended, said diversification may easily be implemented. Furthermore, by storing the responder-specific session keys in a secure element, it may be ensured that a particular shared responder-specific session key is only available to the multicasting or broadcasting communication node and the legitimate responder node, i.e. the responder node intended to use said particular shared responder-specific session key.

In one or more embodiments, the communication node further comprises an authentication unit configured to perform a mutual authentication process with the external responder nodes. In this way, the authenticity of the communication node and the responder nodes can easily be verified. Furthermore, the mutual authentication process can be performed before the cryptographic keys are shared. Accordingly, the probability that for instance a particular shared responder-specific session key is only shared with the legitimate responder node is further increased. Furthermore, in one or more embodiments, the messages and the responses include scrambled timestamp sequences and payloads. The use of scrambled timestamp sequences facilitates the execution of secure ranging operations between the communication node and the responder nodes. This, in turn, may be useful for localizing the responder nodes and comparing, for example, an estimated location of a particular responder node with an expected location. It is noted that a mismatch between an estimated location and an expected location may also be indicative of an impersonation attempt. Thus, by using said scrambled timestamp sequences in combination with the diversified responder-specific cryptographic session keys, the risk that responder nodes can impersonate each other is further reduced.

In a practical implementation, the common cryptographic session key and the responder-specific cryptographic session keys are usable for a single communication session or for a limited number of communication sessions. Furthermore, in one or more embodiments, the processing unit is further configured to generate a new common cryptographic session key and new responder-specific cryptographic session keys after one or more communication sessions have ended, and to share said new common cryptographic session key and new responder-specific cryptographic session keys with the responder nodes. In particular, the new common cryptographic session key is shared with all the responder nodes and each new responder-specific cryptographic session key is only shared with a specific one of said responder nodes. By regularly generating new session keys, diversifying the newly generated session keys for the responders, and sharing the responder-specific session keys only with the respective legitimate responders, the level of security may be further increased.

In a practical implementation, a communication system comprises a communication node of the kind set forth and a plurality of responder nodes, wherein each one of said responder nodes is configured to use the common cryptographic session key to decrypt messages received from the communication node, and to use the responder-specific session key that has been shared with the respective responder node to encrypt responses to said messages. In one or more embodiments, the communication node is configured to carry out ranging operations with the responder nodes, and said ranging operations include one or more of said messages and one or more of said responses. In this way, secure ranging operations can be carried out in a UWB-enabled communication system. For example, said operations may include two-way ranging (TWR) operations.

In accordance with the present disclosure, a cryptographic separation of responder nodes may be achieved. This may be realized using asymmetric or symmetric cryptographic protocols. In particular, an authentication or service applet can create a unique, responder-specific cryptographic session key for each responder and provide it together with a sub-session identifier to a secure UWB service (SUS) applet. The sub-session identifier and the session identifier are globally unique. Key data can be exchanged and a session key can be derived, which is to be used for the UWB session. It is noted that the UWB session may involve one or more ranging operations. Furthermore, the UWB session may include the execution of a predefined transaction. Once the UWB session is started, a UWB subsystem may fetch the session key associated with the session identifier from the secure element. In an example, this may applied in an access control use case. In that case, a reader acts as a communication node of the kind set forth. The reader performs a mutual authentication process with a mobile phone and configures the mobile phone to act as a responder in a multicast session. This configuration may be performed through an out-of-band communication channel. Then, the mobile phone acting as responder may start to encrypt/decrypt an STS (scrambled timestamp sequence) index. Furthermore, the mobile phone may encrypt data (i.e., a payload). For example, in a two-way ranging session between the reader and the mobile phone, the mobile phone may decrypt an STS received from the reader and encrypt a response to the reader, which includes an STS and a payload.

More specifically, the following operations may be carried out. An authentication or service applet may create a session key and provides it to a SUS applet. Furthermore, the authentication or service applet may create a responder-specific session key for each responder and provide it together with a sub-session identifier to the SUS applet. The sub-session identifier and session identifier are globally unique. For example, a three-byte session identifier may be used, while a short address in a fourth byte may be used to create sub-session identifiers. The session key may be shared out-of-band with all potential responders. Furthermore, a unique responder-specific session key may be shared out-of-band with each individual responder. A list of all responders including a short address and session information (such as the session identifier) may be generated by a host processor and the same may be configured for the UWB device via a UWB command interface (UCI) transport layer. The UWB device may fetch the session key when the multicast session is started on a reader device, which has taken the role of controller/initiator. Subsequently, when new responders are added to the multicast list, the UWB device may be triggered to fetch the session key with a the sub-session identifier corresponding to the new responder address of the multicast list. On the side of the responder (e.g., a phone), which has taken the role of controlee, the session key with the session identifier associated with the multicast session is fetched when said multicast session is started. Furthermore, the UWB device may retrieve a responder-specific session key for each responder from the secure element via the SUS applet by providing the sub-session identifier. The session key may be used to derive all required keys to encrypt/decrypt STSs and payloads. Furthermore, the session key may be used to derive all required keys to encrypt STSs and commands from the controller. Furthermore, the responder-specific session keys may be used to decrypt STSs and payloads from the responders.

Figure 3:
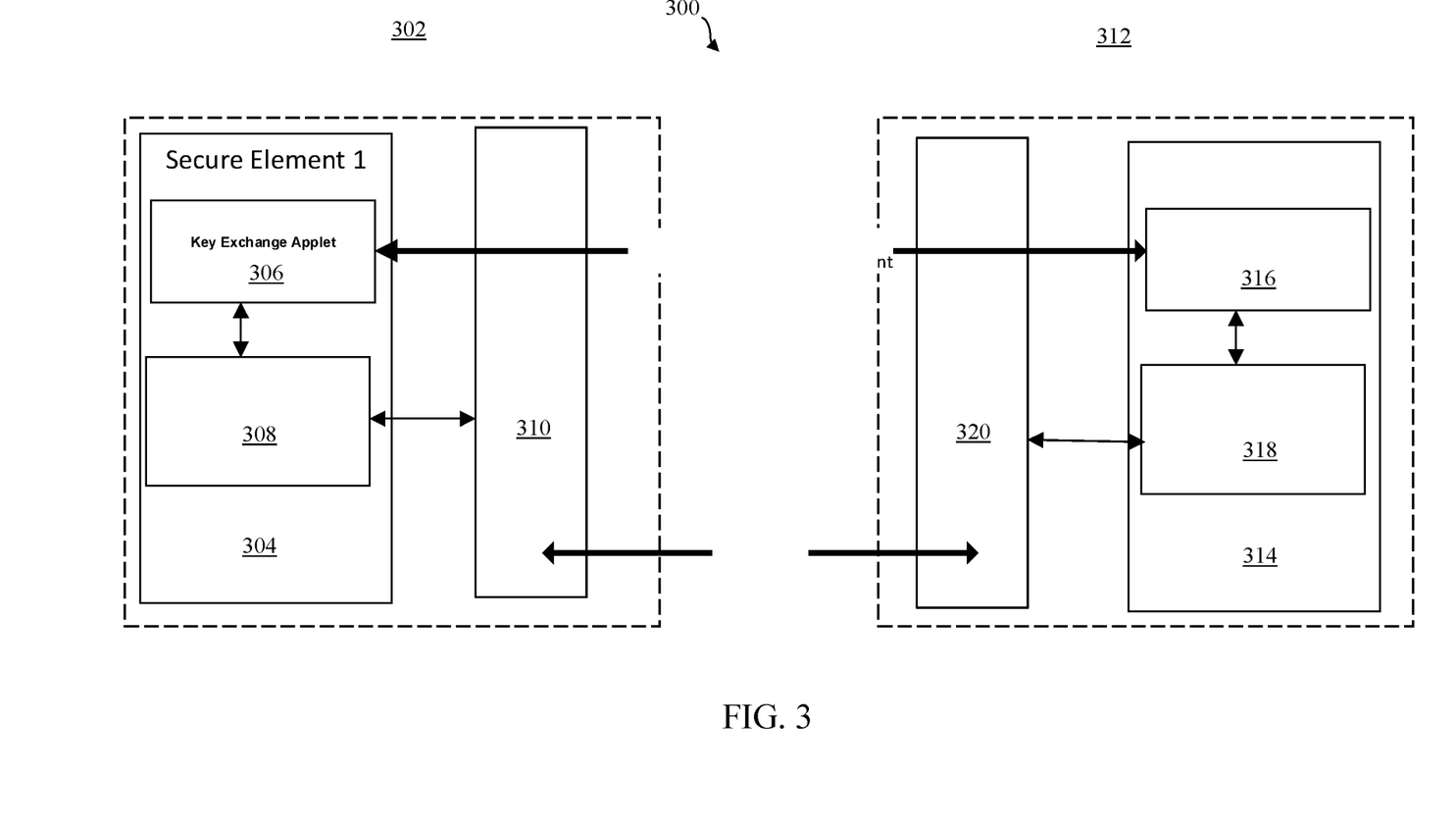
FIG. 3 shows an illustrative embodiment of a UWB device authentication and session key generation process.

FIG. 3 shows an illustrative embodiment of a UWB device authentication and session key generation process 300. After a mutual authentication of the reader 302 (i.e., a communication node of the kind set forth) and the phone 312 (i.e., a responder of the kind set forth), a root session key and responder session key agreement step is executed between a key exchange applet 306 of the reader 302 and a key exchange applet 316 of the phone 312. For this purpose, the key exchange applets 306, 316 interact with the SUS applets 308, 318, which in turn retrieve the relevant keys from a memory (not shown) of the respective secure elements 304, 314. The SUS applets 306, 316 interact with the key exchange applets 306, 316 using JavaCard Shareable Interface Objects (SIOs). Furthermore, the SUS applets 306, 316 may interact with the UWB units 310, 320 using the GlobalPlatform Secure Channel Protocol 03 (GP SCP03). The latter interaction may support the execution of the UWB secure session after the UWB device authentication and session key generation process has been carried out. In a typical functional flow the key exchange applet or the service applet can trigger the authentication between the reader 302 and the phone 312, and the outcome of this authentication is a session key which is mapped to a session identifier on the phone 312 and a responder-specific session key mapped to a sub-session identifier on the reader 302. Translating this to an access control use case, the reader 302 should perform an authentication step with the mobile phone 312 and configure the mobile phone 312 to act as a responder in the multicast session. Such a configuration may be performed out-of-band. Subsequently, the mobile phone 312 acting as a responder may start to encrypt/decrypt STSs and payloads.

Figure 4:
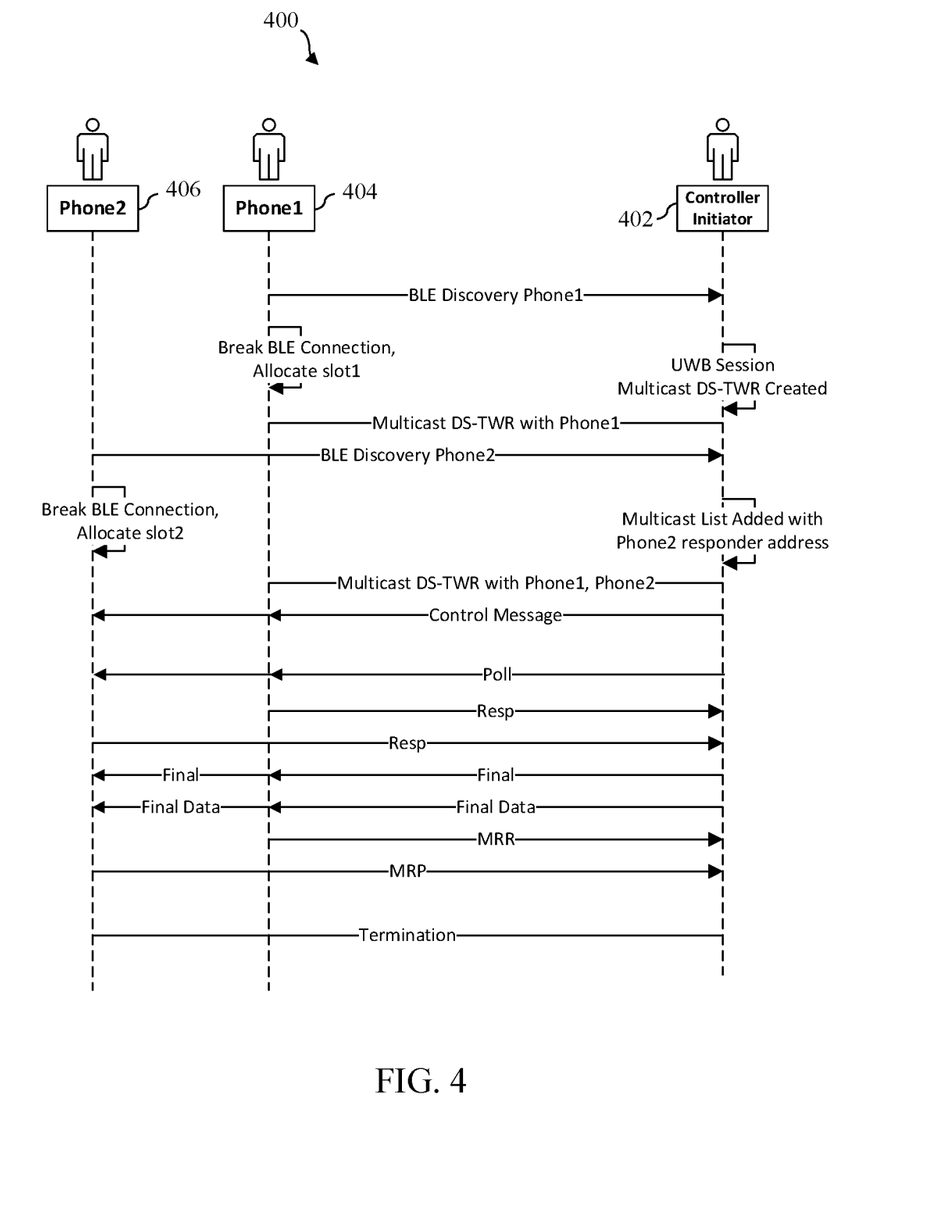
FIG. 4 shows an illustrative embodiment of a dynamic multicast two-way ranging session.

FIG. 4 shows an illustrative embodiment of a dynamic multicast two-way ranging session 400. In particular, a double-sided two-way ranging (DS-TWR) multicast ranging session is shown, wherein a first phone 404 (i.e., a responder) is discovered through an out-of-band communication channel (i.e., a Bluetooth low energy communication channel) by a controller/initiator 402 (i.e., a reader). After this discovery, the DS-TWR multicast ranging session is started with the first phone 404. At a later point in time, a second phone 406 is discovered by the controller/initiator 402 through the out-of-band communication channel, and consequently the multicast list is updated. The active DS-TWR multicast ranging session may now also include ranging operations between the second phone 406 and the controller/initiator 402, in addition to ranging operations between the first phone 404 and the controller/initiator 402.

Figure 5:
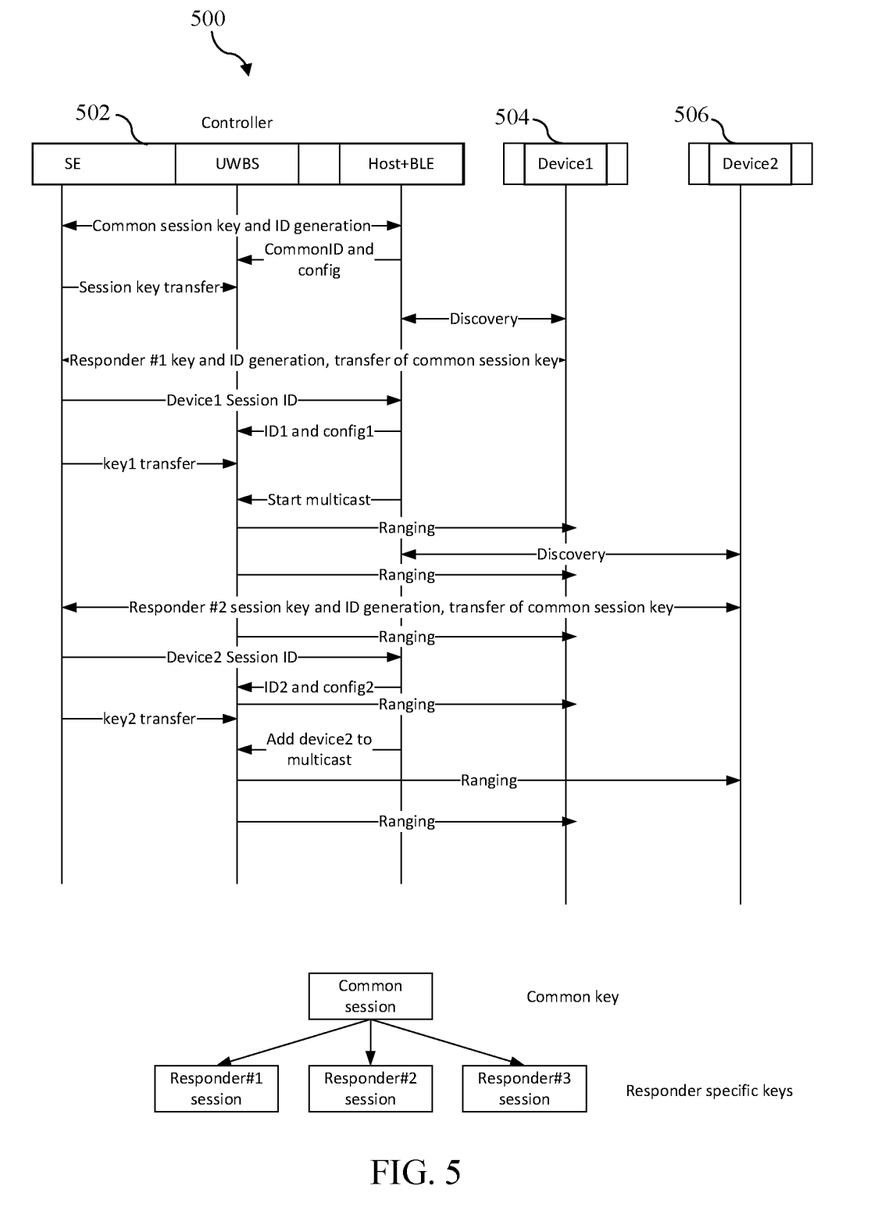
FIG. 5 shows an illustrative embodiment of sub-sessions for multiple responders within a common session.

FIG. 5 shows an illustrative embodiment of sub-sessions for multiple responders within a common session 500. In particular, a controller 502 performs ranging operations with several responders, i.e. a first device 504 (e.g., a first phone) and a second device 506 (e.g., a second phone) within a single multicast ranging session. To this end, multicast sub-sessions are created within the (common) multicast ranging session. Furthermore, sub-session identifiers (i.e., Device 1 Session ID and Device 2 Session ID) are used to retrieve the relevant responder-specific cryptographic session keys from the secure element of the controller 502.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 UWB communication node
102 UWB communication unit
104 processing unit
200 method of operating a UWB communication node
202 transmitting, by an ultra-wideband communication unit comprised in a communication node, one or more messages to a plurality of external responder nodes and receiving, by said communication unit, responses from said responder nodes
204 using, by a processing unit comprised in the communication node, a common cryptographic session key to encrypt said messages, wherein said common cryptographic session key is a key shared between the ultra-wideband communication node and all the external responder nodes
206 using, by said processing unit, responder-specific cryptographic session keys to decrypt the responses and/or to encrypt further messages to the responder nodes, wherein each individual one of said responder-specific session keys is a key shared between the ultra-wideband communication node and one of the external responder nodes
300 UWB device authentication and session key generation process
302 reader
304 first secure element
306 key exchange applet
308 secure UWB service (SUS) applet
310 UWB unit
312 phone
314 second secure element
316 key exchange applet
318 secure UWB service (SUS) applet
320 UWB unit
400 dynamic multicast two-way ranging session
402 controller/initiator
404 first phone
406 second phone
500 sub-sessions for multiple responders within a common session
502 controller
504 first device
506 second device

The invention claimed is:

1. An ultra-wideband communication node, comprising:
an ultra-wideband communication unit configured to transmit one or more messages to a plurality of external responder nodes and to receive one or more responses from said responder nodes;
a processor configured to use a common cryptographic session key to encrypt said messages, wherein said common cryptographic session key is a key shared between the ultra-wideband communication node and all the external responder nodes;
wherein the processor is further configured to use responder-specific cryptographic session keys to decrypt the responses and/or to encrypt further messages to the responder nodes, and wherein each individual one of said responder-specific cryptographic session keys is a key shared between the ultra-wideband communication node and one of the external responder nodes.

2. The communication node of claim 1, comprising a further communication unit which is configured to transmit the common cryptographic session key and the responder-specific cryptographic session keys to the respective external responder nodes.

3. The communication node of claim 2, wherein the further communication unit is a Bluetooth communication unit, a Wi-Fi communication unit or a cellular communication unit.

4. The communication node of claim 1, further comprising a secure element, wherein the common cryptographic session key and the responder-specific cryptographic session keys are stored in said secure element.

5. The communication node of claim 1, wherein the ultra-wideband communication unit is further configured to receive identifiers from the external responder nodes, wherein said identifiers uniquely identify the external responder nodes, and wherein the processor is further configured to use the identifiers to retrieve responder-specific cryptographic session keys from the secure element.

6. The communication node of claim 1, wherein the messages are multicast messages or broadcast messages.

7. The communication node of claim 1, further comprising an authentication unit configured to perform a mutual authentication process with the external responder nodes.

8. The communication node of claim 1, wherein the messages and the responses include scrambled timestamp sequences and payloads.

9. The communication node of claim 1, wherein the common cryptographic session key and the responder-specific cryptographic session keys are usable for a single communication session or for a limited number of communication sessions.

10. The communication node of claim 1, wherein the processor is further configured to:
generate a new common cryptographic session key and new responder-specific cryptographic session keys after one or more communication sessions have ended;
share said new common cryptographic session key and new responder-specific cryptographic session keys with the responder nodes, wherein the new common cryptographic session key is shared with all the responder nodes and each new responder-specific cryptographic session key is shared with a specific one of said responder nodes.

11. A communication system comprising the communication node of claim 1 and the plurality of responder nodes, wherein each one of said responder nodes is configured to:
use the common cryptographic session key to decrypt messages received from the communication node;
use the responder-specific cryptographic session key that has been shared with the respective responder node to encrypt responses to said messages and/or to decrypt further messages received from the communication node.

12. The communication system of claim 11, wherein the communication node is configured to carry out ranging operations with the responder nodes, and wherein said ranging operations include one or more of said messages and one or more of said responses.

13. A method of operating an ultra-wideband communication node, comprising:
- transmitting, by an ultra-wideband communication unit comprised in the communication node, one or more messages to a plurality of external responder nodes and receiving, by said communication unit, one or more responses from said responder nodes;
- using, by a processing unit comprised in the communication node, a common cryptographic session key to encrypt said messages, wherein said common cryptographic session key is a key shared between the ultra-wideband communication node and all the external responder nodes;
- using, by said processing unit, responder-specific cryptographic session keys to decrypt the responses and/or to encrypt further messages to the responder nodes, wherein each individual one of said responder-specific cryptographic session keys is a key shared between the ultra-wideband communication node and one of the external responder nodes.

14. The method of claim 13, further comprising transmitting, by a further communication unit comprised in the communication node, the common cryptographic session key and the responder-specific cryptographic session keys to the respective external responder nodes.

15. The method of claim 14, wherein the further communication unit is a Bluetooth communication unit, a Wi-Fi communication unit or a cellular communication unit.

16. The method of claim 13, wherein the communication node further comprises a secure element, and wherein the common cryptographic session key and the responder-specific cryptographic session keys are stored in said secure element.

17. The method of claim 13, wherein the ultra-wideband communication unit further receives identifiers from the external responder nodes, wherein said identifiers uniquely identify the external responder nodes, and wherein the processing unit uses the identifiers to retrieve responder-specific cryptographic session keys from the secure element.

18. The method of claim 13, wherein the messages are multicast messages or broadcast messages.

19. The method of claim 13, wherein the method is implemented in a computer program comprising executable instructions stored in a non-transitory computer-readable medium, wherein when the executable instructions are executed by a processing unit, cause said processing unit to perform the steps of the method.

* * * * *